(No Model.) 2 Sheets—Sheet 1.
G. A. WASHBURN.
ROTARY ENGINE.
No. 351,231. Patented Oct. 19, 1886.
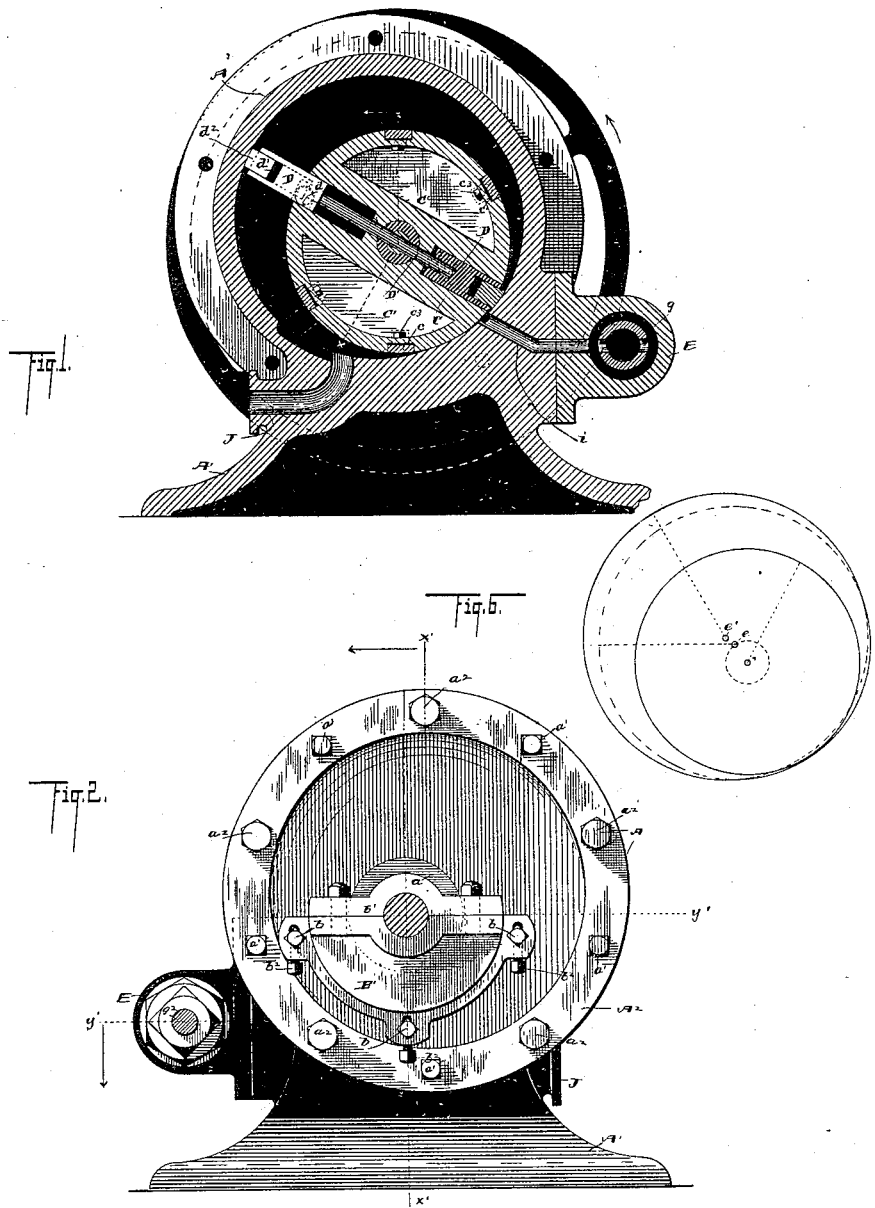
WITNESSES
N. S. Amstutz
Geo. W. King
G. A. Washburn INVENTOR
By
Leggett & Leggett Attorneys (No Model.) 2 Sheets—Sheet 2.
G. A. WASHBURN.
ROTARY ENGINE.
No. 351,231. Patented Oct. 19, 1886.
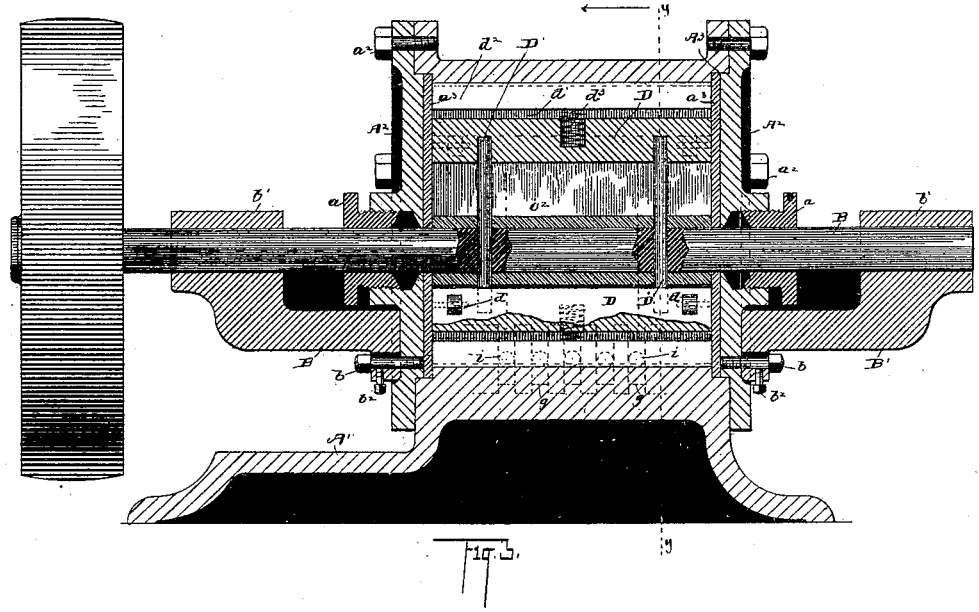
Fig. 3.
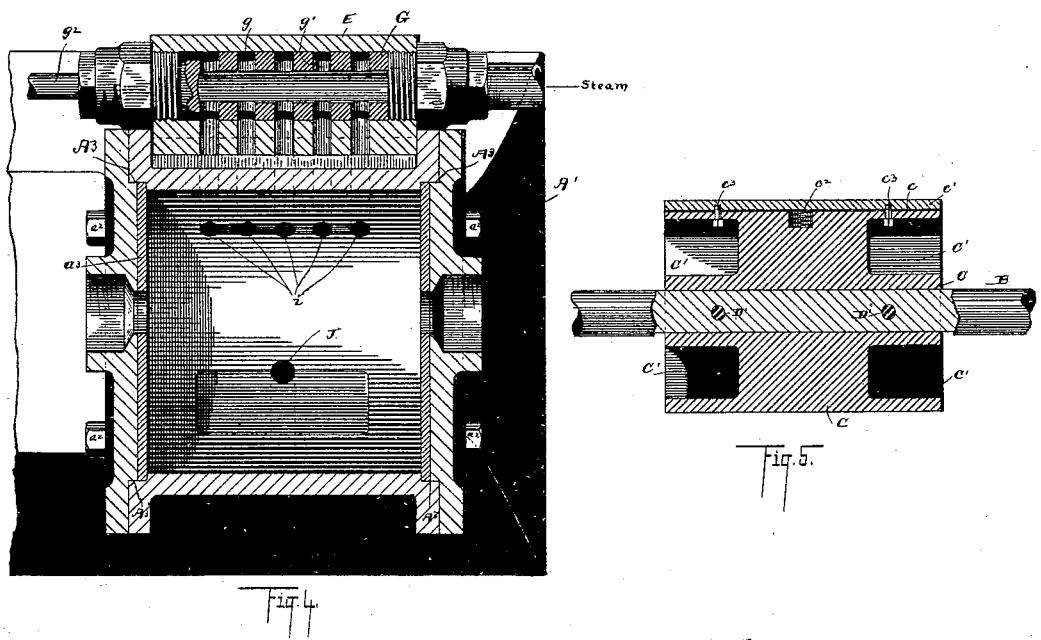
Fig. 4.
Fig. 5.
WITNESSES
N. S. Amstutz
Geo. W. King
G. A. Washburn INVENTOR
By Liggett & Liggett
Attorneys
N. PETERS, Photo-Lithographer, Washington, D. C.

UNITED STATES PATENT OFFICE.

GEORGE A. WASHBURN, OF MEDINA, OHIO, ASSIGNOR OF ONE-FOURTH TO REUBEN W. CLARK, OF SAME PLACE.

ROTARY ENGINE.

SPECIFICATION forming part of Letters Patent No. 351,231, dated October 19, 1886.

Application filed July 3, 1886. Serial No. 207,082. (No model.)

*To all whom it may concern:*

Be it known that I, GEORGE A. WASHBURN, of Medina, in the county of Medina and State of Ohio, have invented certain new and useful Improvements in Rotary Engines; and I do hereby declare the following to be a full, clear, and exact description of the invention, such as will enable others skilled in the art to which it pertains to make and use the same.

My invention relates to improvements in rotary engines in which the cylinder is bored from two centers, the one bore having a greater diameter than the other, and so arranged that the steam is used expansively. Sliding pistons, rigidly connected by rods, are set radially in the piston-wheels, the latter being arranged eccentric with the cylinder and joining it on the one side between the induction and eduction ports. The pistons are provided with anti-friction rollers and packing-blocks of chilled cast-iron, to the end that the friction and wear are thereby reduced to a minimum. A removable cylinder-head is provided with soft-metal packing inserted in the counter-bore of the cylinder, by compressing which packing, by tightening the cylinder-head bolts, the internal movable parts are made to form steam-tight joints with the cylinder-head, abutment-screws being arranged between the cylinder-head bolts to accurately gage the compression of the packing. The engine-shaft is journaled in suitable boxes, the latter being mounted on brackets that are adjustable in a vertical direction, by means of which the piston-wheel is made to engage the cylinder between the two sets of parts—that is to say, approximately at the bottom of the cylinder, as this class of engines are usually constructed. A series of small induction-ports, with a corresponding governor-valve, distributes the steam lengthwise of the cylinder and governs the speed of the engine, the valve being substantially a balance-valve.

In the accompanying drawings, Figure 1 is an elevation in transverse section on the line $y\ y$, Fig. 3. Fig. 2 is an end elevation with the band-wheel removed. Fig. 3 is an elevation in longitudinal section on the line $x'\ x'$, Fig. 2. Fig. 4 is a plan view in section on the line $y'\ y'$, Fig. 2. Fig. 5 is an elevation in longitudinal section on the line $x\ x$, Fig. 1. Fig. 6 is a diagram illustrating the two bores of the cylinder.

A represents the steam-cylinder, with a suitable supporting-base, A'. The cylinder has usually a solid head at one end, and at the other a removable head, $A^2$, secured to the cylinder by bolts $a^2$, in the usual manner. Each head is provided with suitable stuffing-boxes, $a$, around the shaft B, the latter being journaled in boxes $b'$, that are mounted on brackets B'. The piston-wheel C is mounted on and rigidly secured to the shaft inside of and eccentric with the cylinder, and is made to fit nicely between the cylinder-heads, and to engage the cylinder at the bottom thereof, or between the induction and eduction ports, and preferably near the former. To insure a steam-joint between the piston-wheel and cylinder at the aforesaid point of contact, the brackets are made adjustable vertically by means of elongated holes, through which the securing-bolts $b$ pass. Abutment-screws $b^2$ pass through threaded holes in the brackets and engage the under sides of the securing-bolts $b$, by tightening which screws the brackets may be depressed, (first, of course, loosening the securing-bolts a trifle,) by which arrangement the piston-wheel C may be kept in contact with the cylinder. This adjustment of the brackets is so slight and is so seldom required that there is sufficient elasticity in the packing of the stuffing-boxes $a$ to accommodate the shaft, the hole in the cylinder-heads through which the shaft passes being preferably elongated a trifle vertically.

The piston-wheel is chambered at C' and grooved lengthwise at $c$, with metal packing $c'$ fitted in the grooves. Springs $c^2$ press the packing outward, and cap-screws $c^3$ screw into the packing, with the shanks of the screws passing loosely through holes in the wheel, with the heads of the screws forming stops that hold the packing from moving outward too far when not in contact with the cylinder.

Deep slots $C^2$ are made lengthwise on opposite sides of and set radially with the wheel C. In these slots are fitted the wings or pistons D. The two pistons are rigidly connected by rods D', preferably of steel, that pass with an easy fit through holes made through the shaft, and through the walls of the wheel C at the bottom of the slots C². The pistons are provided with friction-rolls $d$ and grooves $d'$ at the ends thereof, and the latter are fitted with packing $d^2$, with springs $d^3$ to press the packing outward.

The packing-blocks $c'$ and $d^2$ are of chilled cast-iron, as it is found that this material is extremely durable, and causes mere nominal friction and wear on the cylinder.

I am not aware that chilled cast-iron has ever been used for packing-rings before my introduction of the same.

The cylinder A is bored from two centers, respectively $e$ and $e'$, located relatively about as shown, the diameter of the bore from the latter being considerably the largest. The two bores run approximately together or near the induction-ports $i$, the line of the larger bore falling inside the smaller bore at this part. As there is but a limited space between the wheel C and the cylinder where the induction-ports $i$ enter, there is a series of these ports arranged in line lengthwise of the cylinder, these ports all leading into the valve-chamber E.

The valve G is a hollow cylinder with annular grooves $g$, that correspond with the ports $i$, leaving the ridges between broad enough to cover the respective ports when the valve is moved endwise. Holes $g'$ are made through the walls of the valve to intersect the grooves $g$. A valve-stem, $g^2$, passes out through a suitable stuffing-box, and is connected with a suitable governor arranged to move the valve endwise, by means of which the flow of steam to the engine is controlled to regulate the speed of the latter. With this arrangement substantially a balance-valve is had.

The pistons D are made to reach across the shortest diameter of the cylinder measured through the axis of the shaft B, and the greater distances at other points are made up by the extension outward of the packing-blocks $c'$, so that a steam-tight joint is always had between the cylinder and the ends of the pistons.

For taking up the wear between the cylinder-heads and the internal movable parts, I have provided the following: The cylinder is counterbored at $A^3$, in the usual manner, to receive the shoulders of the cylinder-head, and the internal parts are so arranged that when the cylinder-head engages the wheel and piston the flange of the cylinder-head stands off somewhat from the end of the cylinder and the internal shoulder of the head does not reach to the bottom of the counterbore, thus leaving an annular groove that is filled with soft-metal packing $a^3$—such, for instance, as lead, a compound of lead and tin, or any suitable soft metal that is compressible under a moderate pressure. The cylinder-head between the securing-bolts is provided with abutment-screws $a'$, the ends of which abut the end of the cylinder. When it is necessary to adjust the cylinder-head to make a tight joint with the internal movable parts, by backing out the screws $a'$ a trifle and tightening the bolts $a^2$, the cylinder-head is drawn in with sufficient force to compress the ring of packing $a^3$. By this arrangement a very accurate adjustment of the cylinder-head may be had, and the head, by means of the abutment-screw, is held rigidly in its adjusted position. Of course the compression of the packing $a^3$ causes the latter to protrude into the cylinder; but the adjustment is so slight that the amount of protruding metal is almost infinitesimal, and is easily shorn off by the packing-blocks $d$.

In operating the engine, suppose the position of parts to be that shown in solid lines in Fig. 1, in which the one piston, having just passed the induction-ports, is receiving the pressure of steam from underneath, while the space in the cylinder above the pistons is of course filled with steam. In the piston it will be seen that there is exposed to the steam-pressure but a small area of the piston adjacent the induction-ports, while the opposite piston has a larger area exposed, giving, therefore, a larger preponderance of pressure to drive the engine. As the pistons advance from this position the steam-spaces in the cylinder above and between the pistons increase and the forward or left-hand piston decreases, and the rearward or right-hand piston increases its exposed area until a position (shown approximately in dotted lines, Fig. 1) is reached where the pistons are exposed equally and the largest steam-space is reached, and consequently the maximum expansion of steam allowed is reached, and as no further motive power can be had in the engine for the steam between the pistons the exhaust occurs at this part of the advanced piston-stroke through the exhaust-port J.

It will be seen more clearly from diagram Fig. 6 that by means of the larger bore, and on the side opposite the induction-port, ample room is had for the expansion of the steam, while by means of the smaller bore, that one on the side next the induction-port extending outside the line of the larger bore, the rear piston adjacent the induction-port and for some distance above is kept largely within the piston-wheel, giving the opposite piston a large preponderance of exposed area. We have, then, a rotary engine using steam expansively, the rear piston acting as a cut-off. As the rear piston takes steam and travels some distance before the forward piston reaches the exhaust-port, there is no dead-center. The mechanism for adjusting the parts is simple and convenient, and the engine will be found practical and desirable in all of its parts.

In the drawings both cylinder-heads are shown removable, as would likely be the case in larger-sized engines.

What I claim is—

1. In a rotary engine, the combination, with a cylinder, piston-wheel, and the connected pistons, arranged substantially as indicated, of packing-blocks set in the piston-wheels lengthwise thereof, springs for pressing the packing outward and screws, arranged as described, to limit the outer movement of the packing-blocks, substantially as set forth.

2. In a rotary engine, the combination, with a cylinder, piston-wheel, pistons arranged substantially as indicated, and a rod connecting the pistons, of anti-friction rolls connected with the piston, the parts being arranged substantially as described.

3. In a rotary engine, the combination, with one or more removable cylinder-heads, of soft-metal packing inserted in the counterbore of the cylinder between the head and bottom of the counterbore, bolts for tightening the heads and compressing the packing, and abutment-screws secured to the heads and bearing against the ends of the cylinder for limiting the compression of the packing, the parts being arranged substantially as described.

4. In a rotary engine, the combination, with cylinder, cylinder-head, and engine-shaft, substantially as indicated, of brackets with boxes mounted thereon for supporting the shaft, elongated holes in the brackets for the passage of the securing-bolts, and set-screws bearing against the adjusting-bolts for adjusting the brackets to bring the piston-wheel in contact with the cylinder, the parts being arranged substantially as set forth.

5. The combination, with a rotary engine, substantially as described, of a series of induction-ports arranged in line lengthwise of the cylinder, said ports leading into a governor-valve chamber, a hollow cylindrical governor-valve, the same having a series of annular external grooves corresponding with the ports, and holes through the side walls of the valve opening into said groove, the parts being arranged substantially as set forth.

In testimony whereof I sign this specification, in the presence of two witnesses, this 17th day of June, 1886.

GEORGE A. WASHBURN.

Witnesses:
 REUBEN W. CLARK,
 GEO. HAYDEN.